United States Patent Office 3,350,373
Patented Oct. 31, 1967

3,350,373
COPOLYMERS FROM 1,2,3,3,3-PENTAFLUORO-PROPYLENE AND TETRAFLUOROETHYL-ENE AND PROCESS FOR PREPARING SAME
Dario Sianesi, Gian Carlo Bernardi, and Gianfranco Diotallevi, Milan, Italy, assignors to Montecatini Edison S.p.A., Milan, Italy
No Drawing. Filed Jan. 23, 1964, Ser. No. 339,585
Claims priority, application Italy, Jan. 25, 1963, 1,587/63
18 Claims. (Cl. 260—87.5)

ABSTRACT OF THE DISCLOSURE

Highly-fluorinated thermoplastic copolymer consisting of polymerized monomeric units derived from tetrafluoroethylene and 1,2,3,3,3-pentafluoropropylene. Process for preparing above copolymer which comprises polymerizing the monomers at a temperature ranging from about −30° to 200° C. in a liquid medium and in the presence of a free-radical polymerization initiator.

---

This invention is directed to polymeric materials containing fluorine and more specifically to thermoplastic copolymers and their method of preparation. Still more specifically, this invention is directed to thermoplastic copolymers of tetrafluoroethylene and 1,2,3,3,3-pentafluoropropylene.

The homopolymers of tetrafluoroethylene are known, particularly for their outstanding characteristics of chemical and thermal resistance. The copolymers of tetrafluoroethylene with substantially fluorinated olefins constitute a class of products having many physical properties comparable to those of the tetrafluoroethylene homopolymers. In general, however, these copolymers differ from the tetrafluoroethylene homopolymers in that they flow in the molten state. Likewise, while the tetrafluoroethylene homopolymers in the molten state do not flow and form incoherent gels at temperatures above the crystalline melting point, some of the tetrafluoroethylene copolymers become viscous liquids at certain temperatures. In addition, before polytetrafluoroethylene can be shaped into an object certain unusual techniques in the steps of processing are required. These processes include, for example, preforming or paste extrusion, and sintering. The copolymers of tetrafluoroethylene, however, due to their flow properties in the molten state, can be shaped and worked by techniques well-known in the thermoplastic art, e.g. extrusion or injection moulding.

It is known, however, that while there is an improvement in the flow properties of molten material obtained from the copolymerization of tetrafluoroethylene with other monomers, there is also a loss in the mechanical properties as well as in the chemical and thermal resistance characteristics. This loss of mechanical properties, etc., may occur especially when non-perfluorinated olefins, that is olefins which do not contain exclusively C—C and C—F bonds, are employed in the copolymerization of tetrafluoroethylene. The loss of these properties usually takes place when tetrafluoroethylene is copolymerized with fluorinated olefins which contain in their molecule C—H bonds arranged in a manner such that in the macromolecules of the resulting copolymer the elimination of HF is favored by many chemical or thermal reactions. Thus, copolymers could be obtained which occasionally possess remarkable working properties in the molten state, but exhibit a decrease in thermal and chemical stability to the extent that they cannot be used for any practical purpose. In practice, it was commonly believed that products having good chemical inertia and thermal stability could not be obtained by copolymerizing tetrafluoroethylene with an olefin containing a C—H bond.

It has now been discovered, quite unexpectedly, that the presence of the

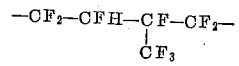

groupings in a chain, the rest of which consist of enchained perfluoromethylene groups, does not lead to a decrease in the chemical and thermal stability. It has been found that a very limited number of such grouping in the polyfluoroethylene chain is sufficient to impart flow properties to the product in the molten state and consequently render the product workable by conventional techniques used for other thermoplastic polymers.

Accordingly, it is an object of this invention to provide polymeric materials containing fluorine and having chemical and physical resistant properties comparable to those of polytetrafluoroethylene. Moreover, it is an object of this invention to provide polymeric materials which have flow characteristics in the molten state sufficient to allow them to be shaped from the melt.

It is another object of this invention to provide a process for the preparation of fluorinated polymeric materials. More specifically, it is an object of this invention to provide a process for preparing polymers made up of tetrafluoroethylene and 1,2,3,3,3-pentafluoropropylene.

These and other objects of the invention will become obvious from a further and more detailed description to follow.

The polymers of this invention are prepared by copolymerizing mixtures of tetrafluoroethylene and 1,2,3,3,3-pentafluoropropylene in the presence of an effective amount of a polymerization initiator which decomposes into free radicals or at least is capable of forming free radicals.

The product 1,2,3,3,3-pentafluoropropylene can be obtained by means of a process described in the literature, see R. N. Haszeldine, B. R. Steele, Journal of Chemical Society, 1592, 1953. A convenient process for synthesizing this product comprises subjecting perfluoropropylene to catalytic hydrogenation, in the gas phase, with a palladium or alumina catalyst. By operating at atmospheric pressure and at a temperature ranging from 50° C. to 300° C. with a molar ratio of $H_2/C_3F_6=1$ or higher, a high yield of 1,2-di-hydroperfluoropropane having a boiling point of 6° C., can be obtained. This product can be de-hydrofluorinated with satisfactory yields to obtain 1-hydroperfluoropropylene (1,2,3,3,3-pentafluoropropylene) with a boiling point of −17.5° C. by simply passing the product into an alkaline solution under atm. pressure. The alkaline solution is, for example, an aqueous solution containing from 40% to 90% by weight of KOH at a temperature between 100 and 200° C. The $C_3F_5H$ olefin obtained is 1-hydro-perfluoropropylene or 1,2,3,3,3-pentafluoropropylene substantially free of other isomers such as, for example, 2-hydroperfluoropropylene and 3-hydroperfluoropropylene.

The 1,2,3,3,3-pentafluoropropylene product has never been considered a polymerizable monomer nor has its use in a polymerization process been described in any of the known scientific literature. It has now been discovered, however, that under the conditions described hereinafter, it is possible to copolymerize mixtures of 1,2,3,3,3-pentafluoropropylene and tetrafluoroethylene to obtain high yields of copolymer. This copolymer may contain from about 0.1 to 50% by moles of copolymerized monomeric units of 1,2,3,3,3-pentafluoropropylene. It has been found also that the composition of the copolymer may be varied over a wide range by varying the composition of the monomeric mixture and the temperature at which the polymerization reaction is conducted. Generally, the higher reaction temperatures favor the addition of a larger number of 1,2,3,3,3-pentafluoropropylene units in the copolymer.

Since it was found that the 1,2,3,3,3-pentafluoropropylene is less reactive in the copolymerization than the tetrafluoroethylene, it is important that the polymerization mixture have a higher content of the 1,2,3,3,3-pentafluoropropylene than that which is desired in the final product. Thus, in practice, in order to obtain copolymers having the characteristics described in this invention, it was found that the monomeric copolymerization mixture may contain from about 1 to 90% by volume of the 1,2,3,3,3-pentafluoropropylene with the remainder being the tetrafluoroethylene. The preferred copolymers have a molar content of 1,2,3,3,3-pentafluoropropylene ranging from about 0.1 to 30% with the remainder being tetrafluoroethylene. It was within this percentage range that a remarkable decrease in the melting temperature and viscosity of the product in the molten state was obtained in comparison to the tetrafluoroethylene. More specifically, the preferred copolymers are those which can be easily shaped from the melt and have a crystalline melting or softening point above 200° C. and more preferably ranging from about 200° C. to 325° C. Copolymers having these characteristics must have a sufficiently high content of tetrafluoroethylene.

Characterization of the copolymers of this invention may be obtained by infra-red absorption analysis. The copolymers have an absorption band in the 3.30μ zone attributable to vibration of the C—H bond. A second characteristic absorption band is present in the 7.10μ zone and a third characteristic band appears at approximately 10.20μ. As to the composition, characterization of the copolymer may be accomplished by considering the ratios $$\frac{D7.10}{D4.20} \text{ and } \frac{D10.20}{D4.20}$$

between the optical densities in the areas wherein a characteristic absorption of $CF_3$—$CF$=$CFH/CF_2$=$CF_2$ copolymer occurs, and the optical density at approximately 4.20μ wherein an absorption band typical of the tetrafluoroethylene homopolymers appears. The value of these ratios is directly related to the composition of the copolymer.

The fluorinated copolymers of this invention may be prepared by using different ratios of the comonomers, at temperatures ranging from about −30° C. to about 200° C., under pressures varying from atmospheric to above 300 atm., and in the presence of polymerization initiators which decompose into free radicals or are capable of forming free radicals. The preferred reaction temperature and pressure will depend, however, on the type of catalytic system employed. The ratio of the two comonomers will be selected in accordance with the composition desired in the resulting copolymer. The copolymerization free-radical initiator may be employed in an amount ranging from about 0.001 to 5 percent by weight of the total amount of monomers present, and more preferably in an amount ranging from about 0.01 to 1% by weight. The polymerization may either take place in an aqueous system or not and includes polymerization in an aqueous suspension, aqueous emulsion, polymerization in bulk or in solution. In those cases where polymerization is in solution, inert solvents which do not contain C—H bonds are preferred. More specifically the inert solvents include perhalogenated or perfluorinated compounds which are liquid under operating conditions, and include compounds such as perfluorocyclobutane, perfluorodimethylcyclobutane, perfluoropropylpyrane, tetrafluorodichloroethane, etc. In those instances where these solvents are used, it is also preferred to employ as the initiator perhalogenated or perfluorinated peroxy compounds such as peroxides of trichloroacetic acid, heptafluorobutyric acid, trifluoroacetic acid, pentafluoropropionic acid, perfluorocaprylic acid, etc. In addition, peroxides of the ω-hydroperfluoro acids having the general formula $H(CF_2)_n$—$COOH$ wherein "$n$" ranges from 1 to 8 may be used. When under certain conditions, the comonomer of tetrafluoroethylene is in the liquid state, then it is possible and convenient to employ an excess of this comonomer as the reaction medium, so as to avoid the use of diluents. The copolymerization reaction may be carried out by means of actinic, ultra-violet or nuclear radiation or further with the aid of ionic catalysts without departing from the spirit and the scope of this invention.

The aqueous polymerization systems contain as the initiator a peroxy compound which includes, for example, water-soluble organic peroxides, diperoxides or hydroperoxides or the inorganic peroxides. The inorganic peroxides include, for example, ammonium or alkaline and alkaline earth metals persulphates, perphosphates, perborates, barium peroxide, sodium peroxide, hydrogen peroxide, etc. Typical examples of the organic peroxy compounds which may be used include, for example, benzoyl peroxide, p. chlorobenzoyl peroxide, 2,4-dichlorobenzoyl peroxide, acetyl peroxide, trichloroacetyl peroxide, lauroyl peroxide, succinyl peroxide, di-t.-butyl peroxide, peroxides and hydroperoxides of methylethylketone and of cyclohexanone, t-butyl perbenzoate, t-butyl-hydroperoxide, cumyl hydroperoxide and the like. The initiator may also include aliphatic azo-compounds such as alpha, alpha'-azobis(isobutyronitrile), alpha, alpha'-azobis(alpha-methyl-gamma-carboxybutyronitrile), alpha, alpha'-azobis (alpha, gamma - dimethyl - gamma - carboxy - valeronitrile), alpha, alpha'-azobis(alpha-propyl-gamma-carboxybutyronitrile).

Other ingredients which may be employed in the aqueous polymerization systems include emulsifying agents, activitors, accelerators, modifiers, buffers, etc. The emulsifying agents include the alkali, alkaline earth or ammonium salts of the perhalogenated or ω-hydroperhalogenated fatty acids having 6 to 20 carbons atoms. The activators to be used with the peroxy compound include sodium bisulphite, metabisulphite and thiosulphate or, in general, any water-soluble reducing substance. The accelerators include salts of metals occuring in various valence states, such as soluble salts of iron, copper, silver, etc. The modifiers include mercaptans or the aliphatic halocarbons which may be employed to regulate the polymerization reaction. Suitable buffering agents include sodium or potassium mono- or bi-phosphates or mixtures thereof, sodium metaborate, borax, etc.

When the copolymerization reaction is carried out in water, it is preferred to operate at a temperature ranging from about 5° to 100° C. and more preferably at a temperature ranging from about 10° to 90° C. under a pressure ranging from atmospheric to 200 atm. The copolymers obtained by the above-described process may be used preferably for making various manufactured articles, such as shaped objects, fibers, threads, etc.

The following examples illustrate the products and their method of preparation in accordance with this invention.

EXAMPLE 1

A stainless steel 2500 cm.³ autoclave was provided with an anchor stirrer. After a vacuum had been produced in the autoclave, 1000 cm.³ of deaerated water containing 5.20 g. of perfluorooctanoic acid, 1.05 g. of $NaHCO_3$ and 0.064 g. of $Na_2S_2O_5$ were introduced. From a cylinder, 540 g. of a mixture of tetrafluoroethylene and 1-hydroperfluoropropylene having a 1-hydroperfluoropropylene content of 26% by moles were introduced. The autoclave was heated to 60° C. and, by means of a compressor, first 500 cm.³ of water and then further 100 cm.³ of water containing 0.240 g. $(NH_4)_2S_2O_8$ were added. During the course of the copolymerization, more water was added so as to keep a constant pressure of 48 atm. The total amount of water added was 2,116 cm.³. About 75 minutes after the introduction of the catalyst, the autoclave was cooled. The residual gases were collected quantitatively and analyzed. They contained 49% by moles of tetrafluoroethylene. The clear, aqueous solution discharged from the autoclave was admixed with HCl, thus bringing about coagulation of the copolymer, which was then washed and dried. About 315 g. of white copolymer was obtained which was calculated to contain 13% by weight of copolymerized 1,2,3,3,3-pentafluoropropylene. The crystalline melting point of the product, determined by means of a polarizing microscope with heated plate, ranged from 285 to 289° C. A ratio of 1.14 between the optical densities at 10.20 $\mu$ and at 4.20 $\mu$ appeared in the infra-red absorption spectrum. The copolymer may be molded into colorless, transparent, flexible plates by operating at temperatures above 300° C. under a pressure of approximately 100 kg./cm.².

The dynamometric properties were determined, as described in the case of polytetrafluoroethylene in ASTM test methods (1961) D–1457–56T, on specimens consisting of copolymer plates 0.5 mm. thick, obtained by molding the powder at 320° C. with rapid cooling. At room temperature and at a rate of stretching of 50 mm./minute, they showed:

Tensile strength, 345/kg./cm.²
Elongation at break, 320%.

A copolymer specimen, maintained at a temperature of 350° C., subjected to a pressure of 14 kg./cm.², flowed through a cylindrical orifice 2.1 mm. in diameter and 8 mm. long at a constant rate of 8.5 g./h. A copolymer specimen was kept at a temperature of 300° C. for 5 hours in a light current of air. After said treatment, the copolymer, which lost approximately 0.7% by weight, had an ultimate tensile strength of 290 kg./cm.² and an elongation at break of 330%.

Another copolymer specimen was kept at 350° C. for 5 hours under a light nitrogen stream. After such treatment, the copolymer, which lost 0.8% by weight, had an ultimate tensile strength of 320 kg./cm.² and an elongation at break of 325%. Under the same extrusion conditions described above, the treated copolymer flowed at a constant rate of approximately 20 g./h. On plates 0.5 mm. thick, obtained by molding the copolymer at 320° C., thermal resistance tests were carried by heating the plates for a given period in an air-circulating oven over different periods of time. The results are reported in Table I.

TABLE I

|  | 150° C., 8 hrs. | 200° C., 8 hrs. | 230° C. | | 250° C. | |
| --- | --- | --- | --- | --- | --- | --- |
|  |  |  | 6 hrs. | 16 hrs. | 8 hrs. | 16 hrs. |
| Ultimate tensile strength (kg./cm.²) | 315 | 325 | 300 | 300 | 300 | 327 |
| Elongation at break (percent) | 340 | 327 | 380 | 380 | 370 | 377 |

On a series of specimens, obtained as described above from copolymer plates, a number of tests with respect to the stability to chemical agents and solvents were carried out. The plates were kept in the liquid state under examination for 48 hours at 100° C. After said treatment, they were washed with water and brought to constant weight at a temperature of 70° C. under vacuum of 15 mm. Hg. The results on the changes in weight and mechanical properties are reported in Table II.

TABLE II

| Agent | Change in weight (percent) | Change in ultimate tensile strength (percent) | Change in elongation at break (percent) |
| --- | --- | --- | --- |
| 10% water Na₂CO₃ | −0.10 | −1.5 | +6.2 |
| 10% water NaOH | −0.03 | −2.9 | +5.3 |
| 10% alcoholic NaOH | −5.50 | −19 | +6.0 |
| 97% H₂SO₄ | −0.05 | −2.9 | +6.0 |
| 65% HNO₃ | −0.06 | −1.5 | +6.3 |
| Toluene | +0.35 | −9.6 | +3.1 |

EXAMPLE 2

About 0.0117 g. of $(NH_4)_2S_2O_8$, 0.250 g. of $Na_2HPO_4 \cdot 10H_2O$ 0.150 g. of perfluorocaprylic acid and 0.0168 g. of NaHCO₃ were introduced into a 120 cc. stainless steel autoclave. About 50 cc. of distilled and deaerated water were then added, while keeping a nitrogen stream in the autoclave. The autoclave was closed and cooled to −78° C., and 19.56 g. of 1,2,3,3,3-pentafluoropropylene and 14.77 g. of $C_2F_4$ were distilled under a vacuum.

The autoclave was immersed in an oil bath at 80° C. and kept in alternate agitation for 16 hours at this temperature. At the end, the residual gases were removed and a clear solution was discharged from the autoclave from which, by addition of HCl, a finely-dispersed, white copolymer precipitated. The copolymer was filtered, washed first with water and then with methanol, and then dried at 120° C. under a vacuum of 15 mm. Hg.

About 2.86 g. of white copolymer, having a melting range, determined by a polarizing microscope, of from 155° C. to 165° C., were obtained.

The copolymer could be pressure-molded between two plates kept at a temperature of 180° C., into transparent, colorless, flexible plates. Its dynamometric characteristics, determined as described in Example 1, were as follows:

Ultimate tensile strength, 200 kg./cm.²
Elongation at break, 350%.

In the infra-red spectrum, the copolymer showed a ratio of 3.57 between the optical densities at approximately 10.20$\mu$ and at approximately 4.20$\mu$.

EXAMPLE 3

About 0.030 g. of $(NH_4)_2S_2O_8$, 0.008 g. of $Na_2S_2O_5$, 0.300 g. of ammonium perfluorocaprylate and 100 cc. of H₂O were introduced with a light stream of nitrogen into a stainless steel autoclave having a 200 cc. capacity.

During the operation, the autoclave was kept at −78° C. and water was introduced in small amounts and frozen in layers.

The various salts were introduced alternately with the introduction of water so that the salts would not contact each other, but were separated by ice layers. In the autoclave, 26.4 g. of 1,2,3,3,3-pentafluoropropylene and 40.0 g. of $C_2F_4$ were distilled under vacuum. The autoclave was kept for 16 hours at 60° C. with alternate stirring. After removal of the residual gases, a clear solution was discharged from the autoclave from which, by addition of HCl, a white copolymer precipitated. The copolymer was filtered, washed and dried. It weighed 17.940 g. and had a crystalline melting range of 245° C.–253° C. The copolymer may be molded at about 280° C. into transparent, colorless, flexible plates. The ratio between the optical densities at about $10.20\mu$ and at about $4.20\mu$ was 1.57. The dynamometric characteristics of the copolymer, evaluated as described in Example 1, were as follows:

Ultimate tensile strength, 320 kg./cm.$^2$
Elongation at break, 320%.

The extrusion rate, under the conditions described in Example 1, was 9.5 g./h.

EXAMPLE 4

The following were introduced into the autoclave described in Example 3: 0.030 g. of $(NH_4)_2S_2O_8$, 0.008 g. of $Na_2S_2O_5$, 0.300 g. of perfluorooctanoic acid, 0.061 g. of $NaHCO_3$, 100 cc. of $H_2O$, 11.88 g. of 1,2,3,3,3-pentafluoropropylene and 51.0 g. of $C_2F_4$.

The autoclave was kept under agitation for 16 hours at 60° C. By operating as described in Example 3, 39.1 g. of white copolymer were obtained, which copolymer had a crystalline melting range of 275–286° C. and was moldable at 300° C. into colorless, transparent, flexible plates. The plates of said copolymer had a ratio between the optical densities at approximately $10.20\mu$ and $4.20\mu$ of 1.0. The dynamometric properties, determined as described in Example 1, were as follows:

Ultimate tensile strength, 300 kg./cm.$^2$
Elongation at break, 260%.

These characteristics remained unaltered after heating the copolymer in air at 300° C. for 5 hours. During the thermal treatment, the copolymer lost 0.12% by weight, while the color did not change.

EXAMPLE 5

Into the same autoclave and by operating according to the same technique as described in Example 3, 0.030 g. of $(NH_4)_2S_2O_8$, 0.008 g. of $Na_2S_2O_5$, 0.300 g. of perfluorooctanoic acid, 0.061 g. of $NaHCO_3$, 100 cc. of $H_2O$, 47.5 g. of 1,2,3,3,3-pentafluoropropylene and 24 g. of $C_2F_4$ were introduced. The autoclave was kept under agitation for 16 hours at 60° C. About 4.6 g. of white copolymer were obtained, which copolymer had a crystalline melting range of 200–214° C. and could be compression molded at temperatures above 200° C. into colorless, transparent, flexible plates. The dynamometric properties, determined as described in Example 1, were as follows:

Ultimate tensile strength, 258 kg./cm.$^2$
Elongation at break, 320%.

The rate of extrusion, under the conditions described in Example 1, was 80 g./h. On a film of copolymer, the ratio between the optical densities at about $10.20\mu$ and $4.20\mu$ was determined as 2.22.

EXAMPLE 6

Into the same autoclave as in Example 2 and by operating as described in Example 3, 0.0175 g. of $(NH_4)_2S_2O_8$, 0.0045 g. of $Na_2S_2O_5$, 0.002 g. of $FeSO_4.7H_2O$, 0.150 g. of ammonium perfluorocaprilate, 50 cc. of $H_2O$, 21.6 g of 1,2,3,3,3-pentafluoropropylene and 16.4 g. of $C_2F_4$ were introduced. The autoclave was closed and kept in motion for 16 hours at 40° C. By operating according to the method described in the preceding examples, 3.2 g. of white copolymer were isolated, which copolymer had a crystalline melitng range of 250–270° C. and was moldable into colorless, transparent, flexible plates. The infrared spectrum for said copolymer showed a ratio between the optical densities at approximately $10.20\mu$ and $4.20\mu$ equal to 1.38.

EXAMPLE 7

Into the same autoclave and by operating in the same manner as described in the preceding example, 0.0175 g. of $(NH_4)_2S_2O_8$, 0.0175 g. of $FeSO_4.7H_2O$, 55 cc. of $H_2O$, 25.4 g. of 1,2,3,3,3-pentafluoropropylene and 20.9 g. of $C_2F_4$ were introduced. The autoclave was kept in agitation at 40° C. for 16 hours. About 0.356 g. of white copolymer were obtained, which copolymer had a crystalline melting range of 245–265° C. and could be molded into transparent, flexible plates.

In the infra-red absorption spectrum of the copolymer, the ratio between the optical densities at approximately $10.20\mu$ and $4.20\mu$ was 1.35.

EXAMPLE 8

Into the autoclave described in Example 2, 0.15 g. of 30% $H_2O_2$, 3.0 g. of perfluorobutyric anhydride, 30 g. of 1,2,3,3,3-pentafluoropropylene and 22 g. of $C_2F_4$ were introduced. The hydrogen peroxide was frozen by cooling the autoclave before introduction of the perflurobutyric anhydride. The autoclave was closed and kept in agitation at 40° C. for 16 hours. After removal of the residual gases, the copolymer was removed from the autoclave and washed with distilled water and methanol, and dried at 120° C. under a vacuum of 15 mm. Hg until a constant weight was reached. The white copolymer weighed 11.42 g. and had a crystalline melting range of 245–281° C. It could be molded into colorless, flexible and transparent plates.

In the infra-red absorption spectrum of the copolymer, the ratio between the optical densities at approximately $10.20\mu$ and $4.20\mu$ was equal to 1.85.

EXAMPLE 9

Into the autoclave of Example 2, 0.020 g. of azo-bis-isobutyronitrile, 30 g. of perfluorocyclobutane, 26.4 g. of 1,2,3,3,3-pentafluoropropylene and 20.0 g. of $C_2F_4$ were introduced. The autoclave was closed and kept in alternate agitation at 80° C. for 16 hours. After evacuation of the residual gases, the copolymer was discharged from the autoclave, washed with methanol and dried. The copolymer weighed 1.87 g. and by a polarizing microscope had a crystalline melting range of 250–260° C. The copolymer was molded into colorless, flexible plates. In the infra-red spectrum, the ratio between the optical densities at $10.20\mu$ and at $4.20\mu$ was 1.33.

EXAMPLE 10

Into the same autoclave as described in Example 2, 0.100 g. of lauroylperoxide, 30 g. of perfluorocyclobutane, 26.1 g. of 1,2,3,3,3-pentafluoropropylene and 19.0 g. of $C_2F_4$ were introduced. The autoclave was closed and kept in motion for 16 hours at 80° C. After evacuation of the residual gases, the copolymer was removed from the autoclave, washed with methanol and dried. The white copolymer weighed 4.125 g. and showed a crystalline melting range of 235–244° C. with a polarizing microscope. In the infra-red spectrum, the ratio between the optical densities at approximately $10.20\mu$ and $4.20\mu$ was 1.50.

The copolymer could be molded into colorless, transparent, flexible plates at temperatures above 250° C.

EXAMPLE 11

Into the same autoclave as described in Example 2, 0.200 g. of benzoyl peroxide, 50 cc. of $H_2O$, 10.0 g. of 1,2,3,3,3-pentafluoropropylene and 22.5 g. of $C_2F_4$ were introduced. The autoclave was closed and kept in agitation for 16 hours at 80° C. After evacuation of the residual gases, the copolymer was removed from the autoclave, washed with hot methanol and dried. The resulting copolymer was white and had a crystalline melting range of 280–302° C. It could be molded into transparent and flexible plates. In the infra-red spectrum, the ratio between the optical densities at approximately $10.20\mu$ and $4.20\mu$ was 1.0.

While this invention has been described with respect to a number of specific embodiments, it is obvious that there are many other modifications and variations which can be made without departing from the spirit of the invention, except as more particularly pointed out in the appended claims.

What is claimed is:

1. A highly-fluorinated thermoplastic copolymer consisting of polymerized monomeric units derived from tetrafluoroethylene and 1,2,3,3,3-pentafluoropropylene.

2. The copolymer of claim 1 which contains from about 0.1 to 50% by moles of copolymerized monomeric units of 1,2,3,3,3-pentafluoropropylene.

3. The copolymer of claim 1 further which contains from about 0.1 to 30% by moles of copolymerized monomeric units of 1,2,3,3,3-pentafluoropropylene.

4. The copolymer of claim 1 which has a crystalline melting point ranging from about 200–325° C.

5. A process for preparing a highly-fluorinated thermoplastic copolymer consisting of polymerized monomeric units derived from tetrafluoroethylene and 1,2,3,3,3-pentafluoropropylene which comprises polymerizing said monomers at a temperature ranging from about −30° to 200° C. in a liquid medium and in the presence of an effective amount of a free-radical polymerization initiator.

6. The process of claim 5 wherein the liquid medium is a perhalogenated inert solvent selected from the group consisting of perfluorohydrocarbons, perfluorochlorohydrocarbons, and perfluorinated cyclic ethers.

7. The process of claim 6 wherein the polymerization initiator is a perhalogenated organic peroxy compound.

8. The process of claim 6 wherein the polymerization initiator is an aliphatic azo compound.

9. The process of claim 5 wherein the liquid medium is 1,2,3,3,3-pentafluoropropylene.

10. The process of claim 5 wherein the liquid medium is water and the polymerization initiator is a water soluble organic peroxy compound.

11. The process of claim 5 wherein the liquid medium is water and the polymerization initiator is a water-soluble inorganic peroxy compound.

12. The process of claim 5 wherein the liquid medium contains water and an effective amount of an emulsifier selected from the group consisting of alkali, alkaline earth, and ammonium salts of perhalogenated and hydroperhalogenated fatty acids having 6 to 20 carbon atoms.

13. The process of claim 12 wherein the liquid medium contains an effective amount of a buffer.

14. The process of claim 13 wherein the liquid medium contains an effective amount of an accelerator.

15. The process of claim 13 wherein the liquid medium contains an effective amount of an activator.

16. The process of claim 5 wherein the amount of said free-radical polymerization initiator is between about 0.001 and 5 weight percent based on the weight of said monomers.

17. The process of claim 5 wherein the amount of said free-radical polymerization initiator is between about 0.01 and 1 weight percent based on the weight of said monomers.

18. Fibers, threads or flexible plates prepared from the copolymer of claim 1.

No references cited.

JOSEPH L. SCHOFER, *Primary Examiner.*

J. A. DONAHUE, *Assistant Examiner.*